United States Patent
Ward et al.

(10) Patent No.: US 11,645,719 B2
(45) Date of Patent: May 9, 2023

(54) DYNAMIC EVENT DEPICTION FACILITATING AUTOMATIC RESOURCE(S) DIVERTING

(71) Applicant: INTERNATIONAL BUSINESS MACHINES CORPORATION, Armonk, NY (US)

(72) Inventors: Thomas Ward, Highland, NY (US); Rahul Nahar, South Burlington, VT (US); Hans-Juergen Eickelmann, Nieder-Hilbersheim (DE); Chester D. Karwatowski, Shokan, NY (US); Rajaram Krishnamurthy, Pleasant Valley, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 498 days.

(21) Appl. No.: 15/831,451

(22) Filed: Dec. 5, 2017

(65) Prior Publication Data
US 2019/0172147 A1    Jun. 6, 2019

(51) Int. Cl.
*G06Q 40/08*    (2012.01)
*G06T 17/05*    (2011.01)
(Continued)

(52) U.S. Cl.
CPC ......... *G06Q 40/08* (2013.01); *G06F 16/2477* (2019.01); *G06F 16/29* (2019.01);
(Continued)

(58) Field of Classification Search
CPC ...................................................... G06Q 10/08
(Continued)

(56) References Cited

U.S. PATENT DOCUMENTS 8,114,172 B2    2/2012  Givon
8,521,728 B1 *  8/2013  Castello ................. G06F 16/40
                                                           707/723
(Continued)

FOREIGN PATENT DOCUMENTS

WO    WO2016175831 A1    11/2016

OTHER PUBLICATIONS

Ward et al., "The Missing Link? IBM's Watson technology bridges gap between supply chain risk management and big data", Supply Chain Navigator, an Avnet Publication, Jan. 2017. (pp. 1-7). http://scnavigator.avnet.com/article/january-2017/the-missing-link/.
Banker, "Using Weather Data to Improve Supply Chain Resiliency", Forbes, Jun. 29. 2016. (pp. 1-3). https://www.forbes.com/sites/stevebanker/2016/06/29/using-weather-to-improve-supply-chain-resihency/#alce4bf23f2.
(Continued)

*Primary Examiner* — Cho Kwong
(74) *Attorney, Agent, or Firm* — Tihon Poltavets, Esq.; Kevin P. Radigan, Esq.; Heslin Rothenberg Farley & Mesiti P.C.

(57) ABSTRACT

Visualizing event impact risk over time. At least one location of interest is identified on a geospatial map, and an event path is plotted on the geospatial map for an event over time. The event path includes actual and/or forecasted paths of the event. Along the event path, connected geospatial polygons are generated. The geospatial polygons represent actual and/or forecasted intensity of the event over time. A determination is made as to whether the connected geospatial polygons intersect one or more of the locations of interest indicating an impact risk for the event. Action are taken to reduce the impact risk for the location of interest.

19 Claims, 12 Drawing Sheets

(51) Int. Cl.
| | |
|---|---|
| *G06F 16/29* | (2019.01) |
| *G06F 16/2458* | (2019.01) |
| *H04W 4/029* | (2018.01) |
| *G06F 16/904* | (2019.01) |
| *G06T 11/20* | (2006.01) |
| *G06F 16/909* | (2019.01) |
| *H04W 4/90* | (2018.01) |

(52) U.S. Cl.
CPC .......... *G06F 16/904* (2019.01); *G06F 16/909* (2019.01); *G06T 11/206* (2013.01); *G06T 17/05* (2013.01); *H04W 4/029* (2018.02); *H04W 4/90* (2018.02)

(58) Field of Classification Search
USPC ............................................................. 705/4
See application file for complete search history.

(56) References Cited

U.S. PATENT DOCUMENTS

| | | | |
|---|---|---|---|
| 2004/0260703 | A1 | 12/2004 | Elkins et al. |
| 2014/0018950 | A1* | 1/2014 | Linton ..................... G06N 5/02 700/104 |
| 2014/0018951 | A1 | 1/2014 | Linton et al. |
| 2014/0058775 | A1 | 2/2014 | Siig et al. |
| 2016/0217399 | A1 | 7/2016 | Roelofs et al. |
| 2017/0124495 | A1 | 5/2017 | Saxena et al. |

OTHER PUBLICATIONS

"Supply Chain Risk Insights—Powered by Watson" Target Magazine, Association for Manufacturing Excellence. Nov. 2016 (pp. 1-4). presenter Thomas Ward. http://www.ame.org/ame-dallas-2016/presentation/supply-chain-risk-insights-powered-watson.

Ward (Jun. 2016). Supply Chain Risk Insights Powered by Watson [PowerPoint] Presented at JPIM/MSI Research Workshop on Innovation in Data-Rich Enviromments, Knoxville. Tennessee Retrieved from http://www.ame.org/ame-dallas-2016/presentation/supply-chain-risk-insights-powered-watson, (pp. 1-18).

IBM, "IBM Supply Chain Business Network is a single, cognitively-enabled, security-rich, cloud-based platform that delivers the ability for organizations to electronically integrate with their trading partners to help optimize their supply chain." IBM United States Software Announcement 217-199, Jul. 31, 2017, (pp. 1-9).

IBM, "Weather Company Outage Management helps utility companies better prepare and respond to weather-driven power outages," IBM United States Software Announcement 217-251, Jun. 13, 2017, (pp. 1-8).

IBM, "PowerISA—V. 2.07B," Apr. 9, 2015, (pp. 1-1528).

IBM, "z/Architecture—Principles of Operation," IBM Publication No. SA22-7832-11, Twelfth Edition, Sep. 2017, (pp. 1-1903).

Mell, Peter and Tim Grance, "The NIST Definition of Cloud Computing," National Institute of Standards and Technology , Information Technology Laboratory, Special Publication 800-145, Sep. 2011, (pp. 1-8).

* cited by examiner

DYNAMIC EVENT DEPICTION FACILITATING AUTOMATIC RESOURCE(S) DIVERTING

BACKGROUND

One or more aspects relate, in general, to event prediction and risk mitigation, and in particular, to identifying event impact risk for locations of interest over time and taking action to reduce the impact risk.

Managing global supply chains can be difficult. The race for leaner supply chains has placed supply chain sites and suppliers in some unstable regions of the world. Events ranging from major hurricanes to social unrest and epidemics, threaten to disrupt the delivery of products and services.

Predictive storm path models are generally used to inform the public as to potential threats to life and property. However, that information alone is not enough to manage a supply chain to best keep commerce flowing.

SUMMARY

Shortcomings of the prior art are overcome and additional advantages are provided through the provision, in one aspect, of a computer-implemented method of facilitating processing of event impact risk over time. The method includes identifying at least one location of interest on a geospatial map, and plotting, by a processor, an event path on the geospatial map for an event over time. The event path includes at least one of actual and forecasted paths of the event. Connected geospatial polygons along the event path are generated. The geospatial polygons represent at least one of actual and forecasted intensity of the event over time. A determination is made as to whether the connected geospatial polygons intersect one or more of the at least one location of interest. An intersection identifies the one or more of the at least one location of interest as having an impact risk for the event. One or more actions are taken to reduce the impact risk for the one or more of the at least one location of interest.

Computer program products and systems relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

Figure 1:
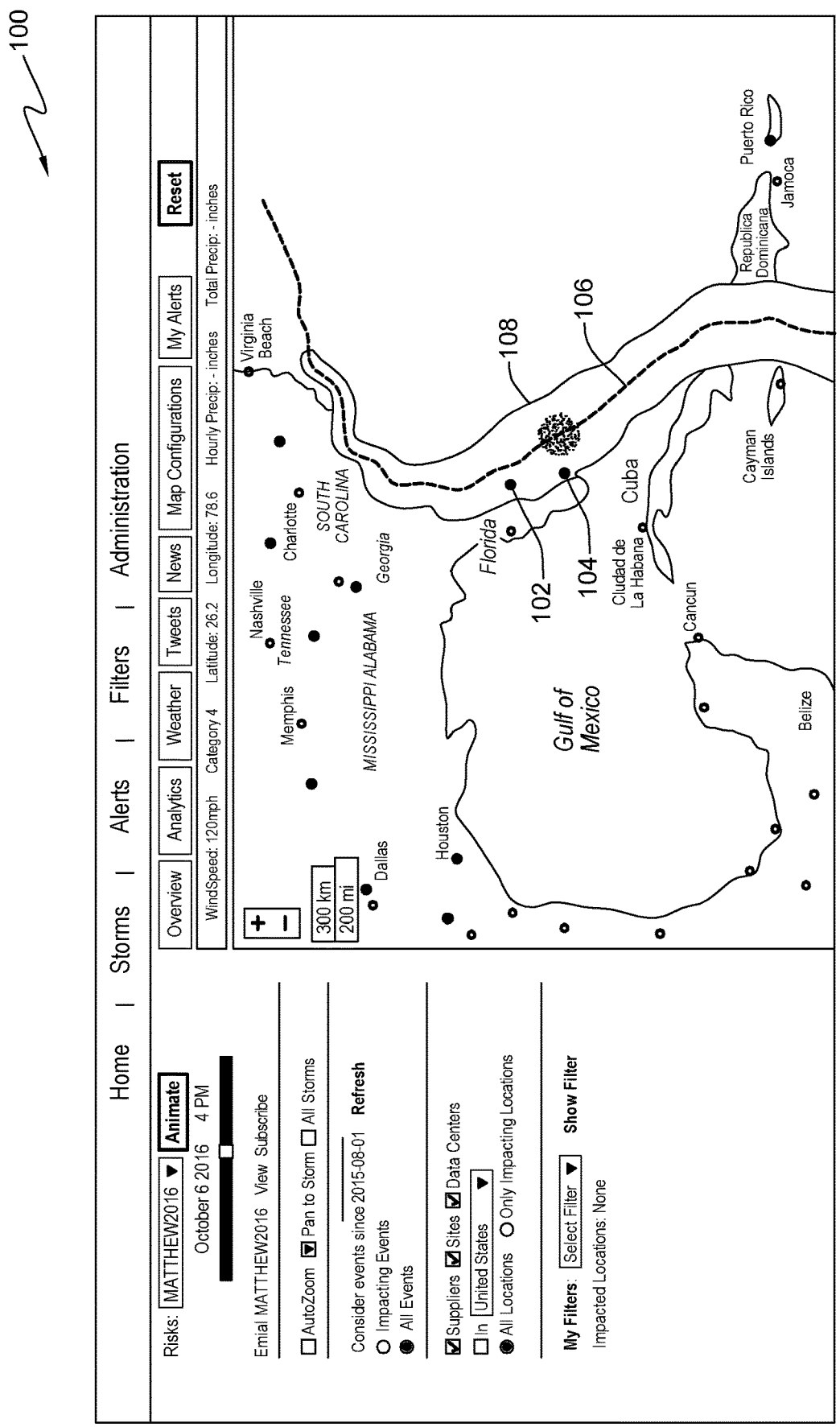
FIG. 1 depicts one example of a screen shot showing an example of visualization of an event (e.g., a storm) impact risk over time, in accordance with one or more aspects of the present invention.

In accordance with one or more aspects of the present invention, event impact risk is visualized enabling actions to be taken to reduce the risks. By identifying and visualizing impact risks, e.g., in real-time, improvements may be made to one or more technical fields relating to, for instance, risk management, advance warning systems, machine learning, computer networks, and/or other fields.

As used herein, the term "event" refers to natural or man-made occurrences. Non-limiting examples of such events include, for example, factory fire/explosion; extreme weather, including, but not limited to, hurricanes, typhoons, cyclones, tornadoes, floods; earthquakes; tsunamis; volcanoes; forest fires; force majeure; acquisition; labor strike/disruptions; factory shut down/disruption; power outages/shortages; chemical spill; port disruptions; supply shortages;

bankruptcy; civil disturbances; business sale or spin-off; price fluctuations and recalls; etc.

In one example, an aspect of the present invention can take the form of a threat visualization service ("Risk Insights") which uses the power of, for example, Watson offered by International Business Machines Corporation, Armonk, N.Y. to help supply chain leaders mitigate risk. Aspects of the invention utilize news, weather event and social media data using Watson technologies to deliver new insights to risk analysts on the IBM cloud, for example. Data is ingested from dozens of real-time reports ranging from The Weather Company (TWC) to Twitter feeds from the National Hurricane Center. The trajectory of each named storm is monitored and displayed on, e.g., Risk Insights. The storm track is supplemented with hourly analyzed news about the climatic event as it occurs. Risk analysts get the latest view of an event, for instance, typhoons and hurricanes, and are alerted when these intersect with their supply base, as an example.

In one example, a risk management solution (e.g., a supply chain risk management solution) that addresses the risk mitigation problem uses a geospatial aspect, and optionally, any one or combination of the other two aspects below: social media and temporal.

Geospatial visualization of risk events: the epicenter of climatic or natural risk events is displayed on a global map along with forecasted, real-time and historical trajectories of the event. In one example, the geospatial representation is placed on top of the location of supply chain points of interest (e.g., manufacturing sites, supplier locations and/or data center locations). More generally, the geospatial representation is overlaid on location(s) of interest for the event. These locations can be static or dynamic (moving) like a truck, airline or ship. Many examples exist.

Social media search and analysis of the risk event is filtered (e.g., for key words related to the event) and provided real-time for the identification of relevant reports from trusted news sources (e.g., Reuters, CNN, BBC and the like) and online news and social networking services (e.g., Twitter, Facebook, Snapchat). All of this risk event information is ingested, analyzed and stored in a database for comparison versus future events.

Temporal: align the geospatial visualization of the risk event over time with the social media reporting over the same time frame to create a temporal profile for each risk event. Each risk event profile is stored for historical analysis.

FIG. 1 depicts one example of a screenshot 100 showing an example of a computer-implemented visualization of event impact risk over time. In this example, two supplier locations 102 and 104 were identified in advance of the impact of the risk event, based on a forecasted path 106 of the storm. As will be explained more fully below, impact risks for the two locations were identified by intersection with connected geospatial polygons 108 (e.g., smoothed polygons), in accordance with one or more aspects of the present invention.

Figure 2:
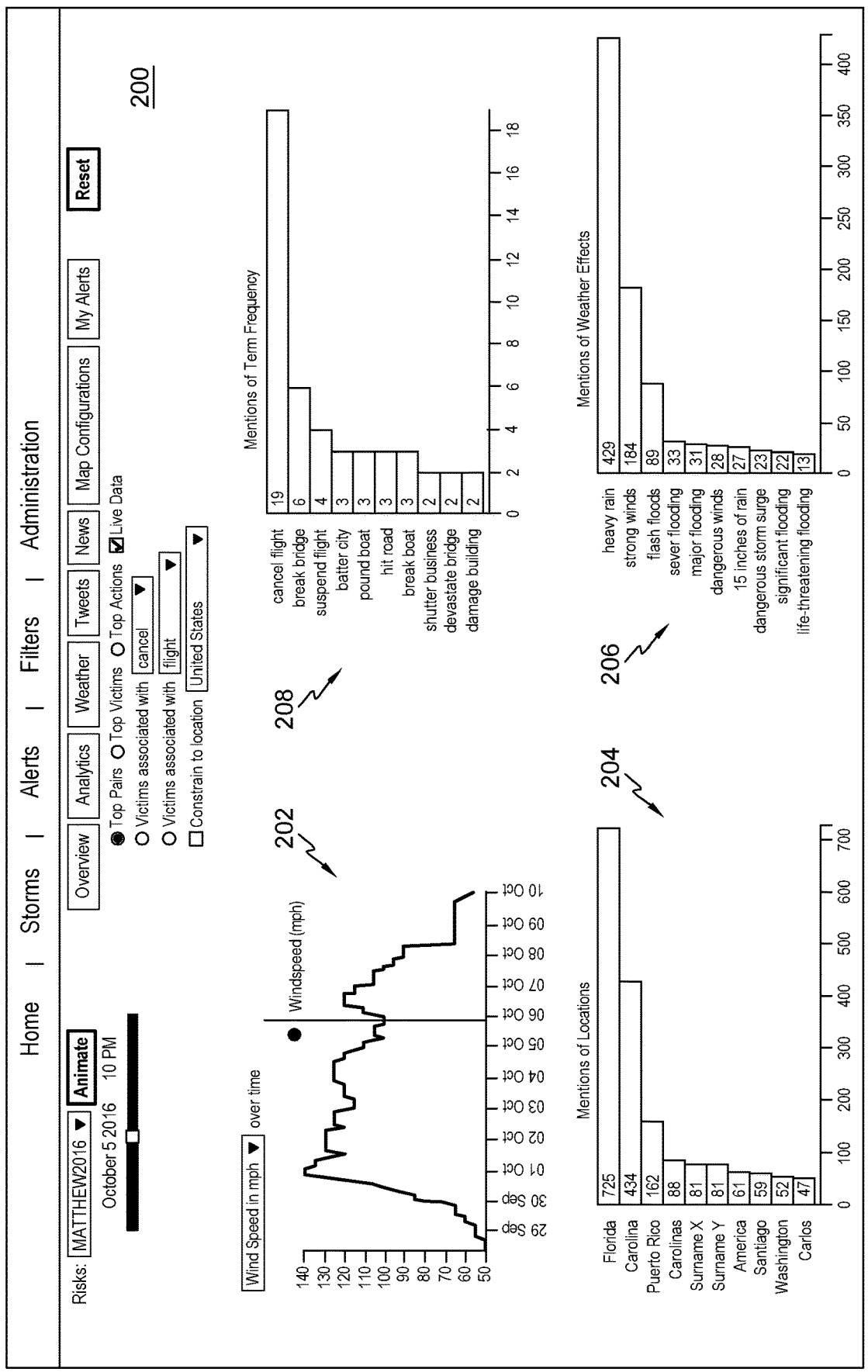
FIG. 2 depicts one example of a screen shot showing an example of social media information that can be used to enhance a visualization of event impact risk over time, in accordance with one or more aspects of the present invention.

In addition to the storm trajectory and identification of locations at risk, a risk analyst may also have real-time access to the latest social media reporting and analysis of the event, as shown in FIG. 2. Visible in the quadrants shown in FIG. 2 of screen shot 200 are the actual and forecasted wind speed of the event 202, the locations referenced in the reports 204 (other information may be captured and indicated as a location, even if it is not a location, such as Surname X), the weather effects 206 being reported (e.g., heavy rain and strong winds), and frequency of relevant terms 208. There is, for instance, the identification of those affected from the risk event and actions describing how these were impacts (e.g., hit city, cancelled flights, destroyed bridges, shuttered business, etc.). This provides a risk analyst a real-time view of how a supplier or production site may be limited in the ability to get goods or services in or out of a region or employees into work to manufacture products, as examples.

In one example, where the event is a storm, such as in FIG. 1, regular climactic event tracking may be used. Latitude and longitude parameters of the storm may be plotted on a geospatial map. Storm path and strength (intensity) prediction may be used to forecast a potential threat to any supplier location in the path of the storm.

In one example, the following rules may be applied to exclude/include locations along the predicted path of a storm system. The below example values refer to radius of concern for locations to be tracked, in case they have sites within the path of the storm system:

Cat1 r=(n miles/2)
Cat2 r=(2n miles/2)
Cat3 r=(3n miles/2)
Cat4 r=(4n miles/2)
Cat5 r=(5n miles/2), where n is 50 in one example. Many other examples exist.

The trajectory of a storm and the forecasted storm category level may be visualized using the rules above and the technique described below, with reference to, for instance the flow diagrams of FIGS. 3 and 4A, and the impact circles of FIG. 5.

Figure 3:
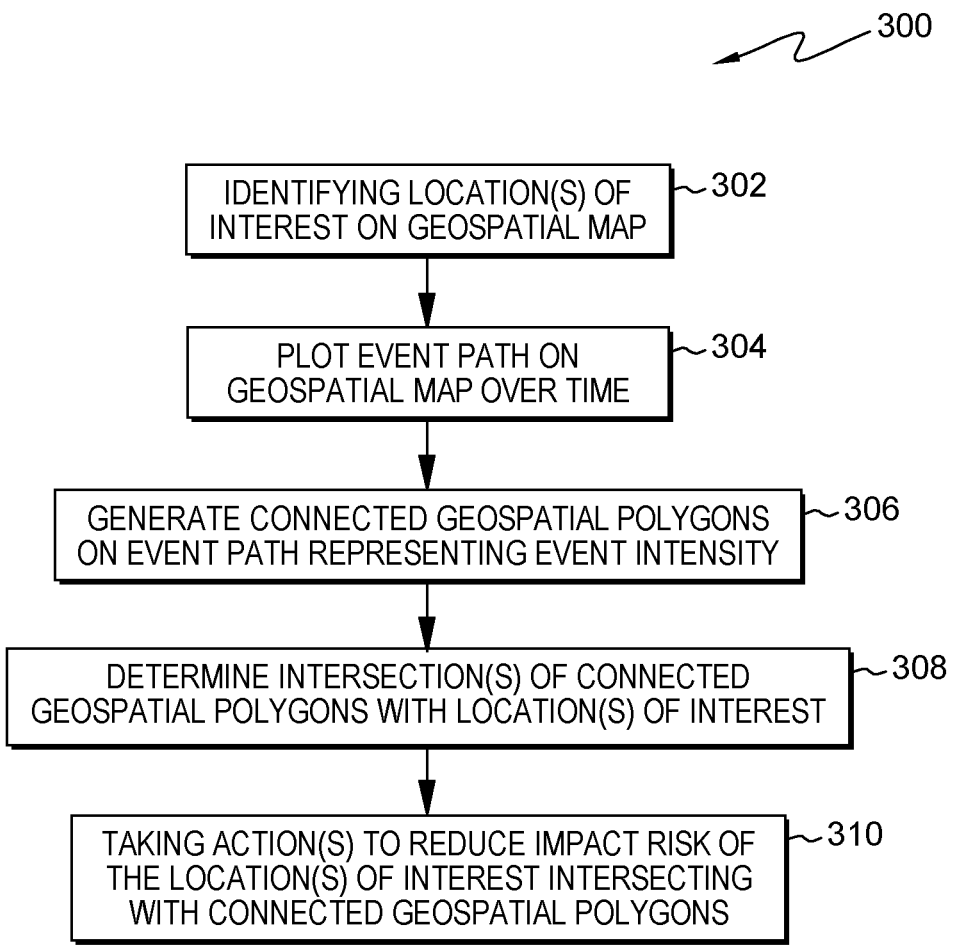
FIG. 3 depicts one example of processing associated with visualizing event impact risk over time, in accordance with one or more aspects of the present invention.

FIG. 3 depicts one example of processing 300 associated with visualizing event impact risk over time. In one example, this processing is performed by at least one processor. Referring to FIG. 3, initially, one or more locations of interest on a geospatial map are identified, STEP 302. In one example, locations of interest may include any or all locations of a company supplier in a supply chain, location of a company plant, research center, headquarters, etc. Many types of locations of interest may be identified. In one example, the locations are automatically defined by a processor using input data relating to a particular entity, such as a company, desiring risk management and mitigation.

An event path may be plotted by a processor on the geospatial map over time, STEP 304. Where the event is, for example, a hurricane, data for the event path can be obtained, for example, from a trusted weather information service (e.g., The Weather Company (TWC), Global Disaster Alert and Coordination System (GDACS), Pacific Disaster Center (PDC) and/or Weather Underground). In one example, one or more application programming interfaces (APIs) from one or more of the weather information services can be obtained and executed by a processor. Using the event information, a path of the event is automatically tracked based on the repeated update of the event over time. In one example, natural language analysis and machine learning of, for instance, social media, internet sources, and structured data, are used to determine event details (e.g., type, size, location, damage, etc.).

On the event path, connected geospatial polygons may be generated, as described below, STEP 306. The geospatial polygons represent an intensity of the event over time. In one example, a relatively larger area of connected geospatial polygons can indicate a higher intensity versus a relatively smaller area. A determination is made of connected geospatial polygons that intersect with the location(s) of interest, STEP 308. An intersection of a connected geospatial polygon with a location of interest indicates that location of interest has an impact risk for the event. The type(s) of impact risks for a location of interest may differ based on the event, the location and the situation.

After one or more locations of interest are identified as having an impact risk, one or more appropriate actions may be taken to reduce the impact risk for the one or more locations of interest, STEP 310. For example, the intersected locations of interest can be notified with or without a recommendation as to the mitigation of the impact risk; more specific actions being on a case-by-case basis. As one particular example, a delivery route may be adjusted. This may include automatically sending new GPS coordinates to the delivery vehicle or automatically sending an alert to a device, such as a mobile phone, computer or tablet indicating the new route, etc. As another particular example, computing services may be automatically diverted to other computers. In yet another example, actions may be taken to prevent access, such as automatically locking doors, raising bridges, etc. This may be for safety reasons. As further examples, the action may include assessing inventory for parts from impacted locations, identifying alternate sources of supply, and/or diverting resources. Many such examples exist.

By obtaining information real-time, decisions may be made promptly (including those made automatically by computing technology), and efficiencies in responding timely may be achieved, including taking appropriate actions, such as providing alerts in real-time and/or automatically performing tasks, such as diverting resources, preventing access, providing information, etc.

Figure 4A:
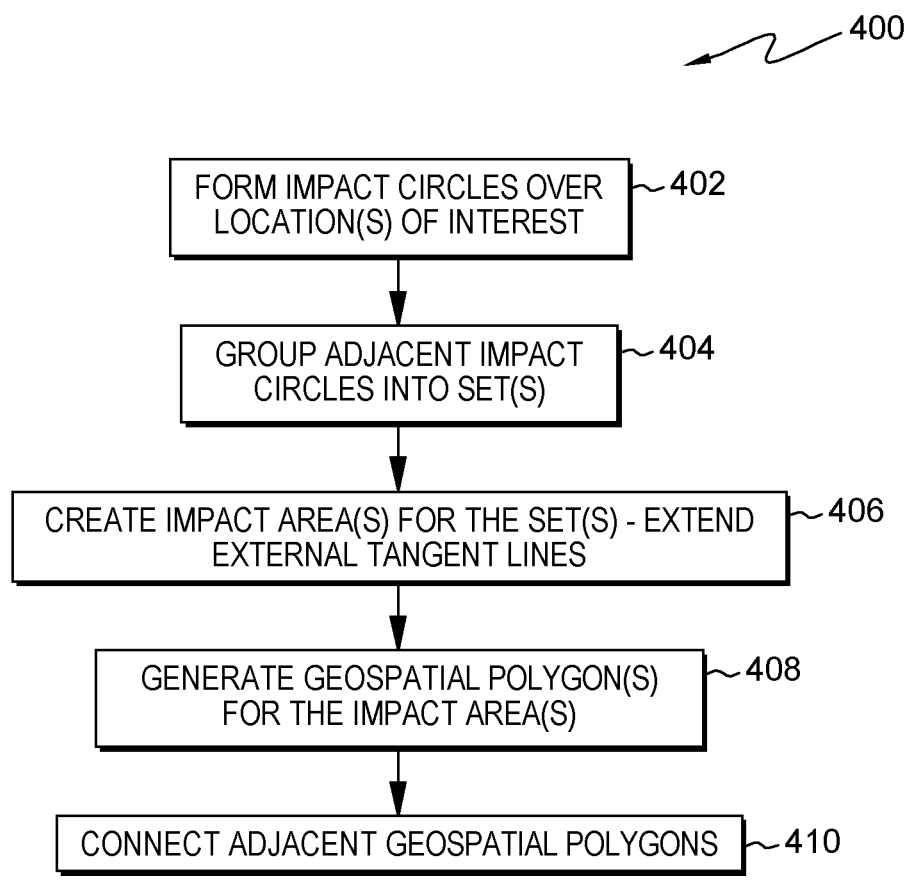
FIG. 4A depicts one example of generating connected geospatial polygons along an event path, in accordance with one or more aspects of the present invention.
Figure 5:
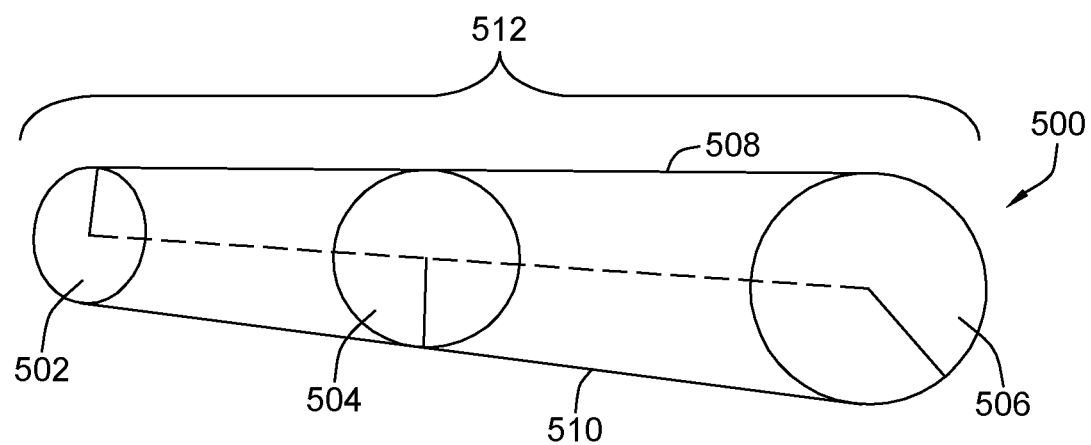
FIG. 5 depicts one example of a set of impact circles for generating a geospatial polygon in accordance with FIG. 4A, in accordance with one or more aspects of the present invention.
Figure 6A:
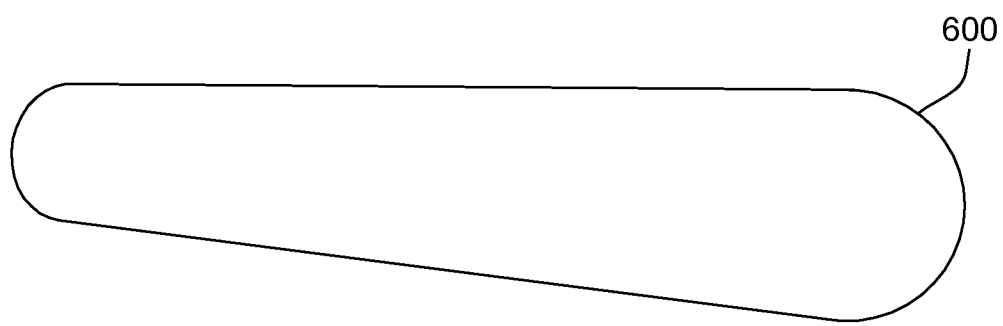
FIG. 6A depicts one example of a geospatial polygon, in accordance with one or more aspects of the present invention.

FIGS. 4A, 5, and 6A-6B describe one example of how to generate connected geospatial polygons along an event path, in accordance with one or more aspects of the present invention. In particular, FIG. 4A depicts one example of processing associated with a geospatial polygon generation process; FIG. 5 depicts one example of generating a geospatial polygon; and FIG. 6A depicts one example of a geospatial polygon. In one example, at least one processor is used to generate the geospatial polygon.

Referring to FIG. 4A, impact circles may be formed over one or more locations of interest, STEP 402, and adjacent impact circles may be geo-typed into one or more sets, STEP 404.

For instance, FIG. 5 depicts one example of a set of three adjacent impact circles 500 (there could be fewer or a greater number), e.g., impact circles 502, 504 and 506. The geospatial map is omitted for clarity of the impact circles. A diameter (or 2× radius) may indicate, for example, an intensity of the event at a given time over a given location of interest, e.g., the greater the diameter, the higher intensity. For example, if the event was a hurricane, a large impact circle could mean, for example, the hurricane is actually or forecasted to be a higher intensity, such as a category 3 versus a category 2. Likewise, as another example, the zone of impact for an earthquake of magnitude 7 on the Richter scale will be larger than a 5.0 scale earthquake. Many other examples exist.

Referring to FIGS. 4A and 5, using the impact circles, an impact area 512 may be created by, for example, extending external tangent lines between adjacent impact circles, STEP 406. As shown in FIG. 5, external tangent lines 508 and 510 are extended across all three impact circles.

Further, one or more geospatial polygons are created for the impact areas, STEP 408. In one example, the outer curves of impact circles 502 and 506 and the extended tangent lines generate a shape for a geospatial polygon. As shown in FIG. 6A, a geospatial polygon 600 is created based on the impact circles and the extended tangent lines.

Figure 6B:
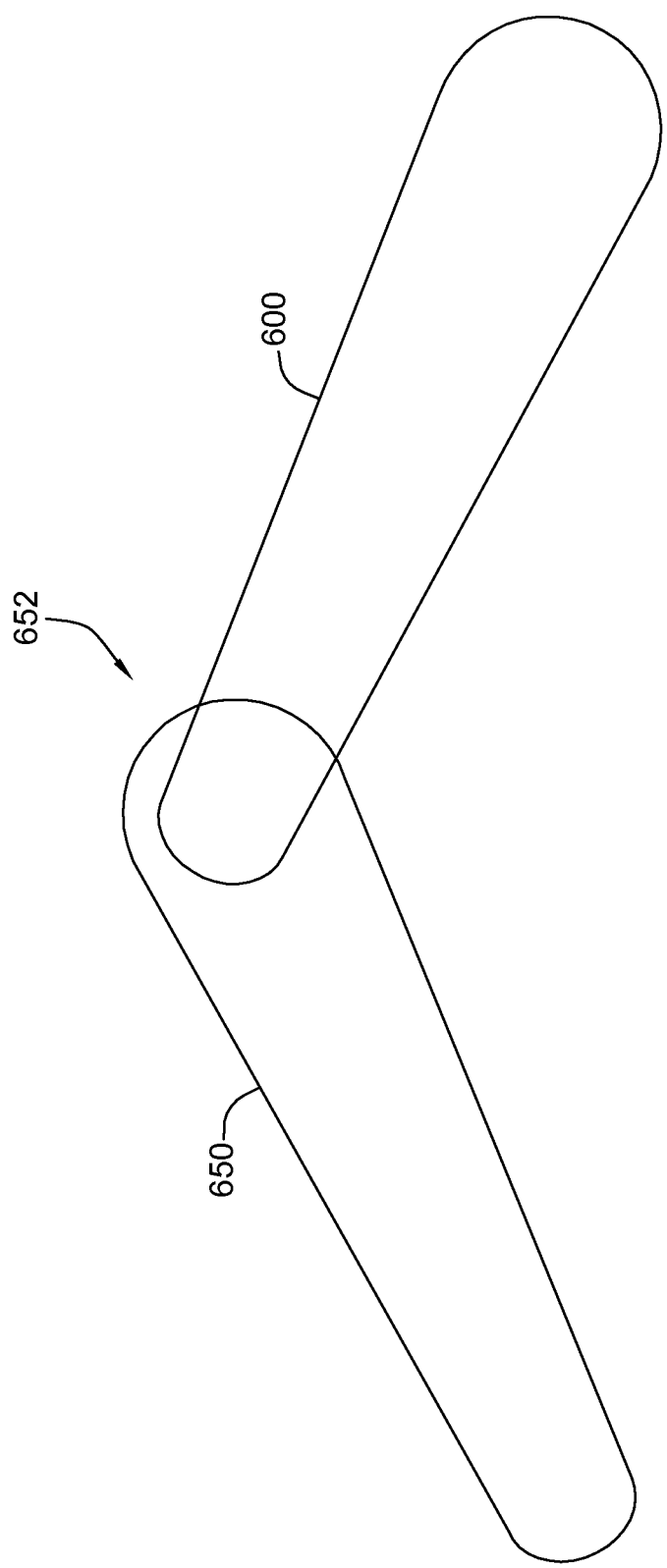
FIG. 6B depicts one example of connected geospatial polygons used in forming part of an event path with impact risk, in accordance with one or more aspects of the present invention.

The above process may be repeated for other sets of impact circles to generate additional geospatial polygons. Adjacent geospatial polygons may then be connected, for example, as they are being generated, STEP 410. For example, as shown in FIG. 6B, geospatial polygon 600 from FIG. 6A may be connected to an adjacent geospatial polygon 650, with an area of intersection 652.

In one example, if any points in the geospatial polygon are too large (which precludes geo-searches) then, optionally iterate through the points on the geospatial polygon and combine points by fitting lines, as long as the error between the line fit and the original polygon line is less than a predetermined tolerance delta, for example. At this point, the polygon line can be replaced by the fitted line. Repeat the process until all (or selected) time intervals are covered for the duration of interest, for example, the duration of the event (e.g., for storms with a wind speed >75 mph).

If the generated polygon size is more than a size used for geo-query—repeat the process by increasing the delta to, e.g., delta ×2, increasing the impact circle radius by delta until the impact polygon is within the desired size.

Further details of one example of creating an impact polygon for a storm are described with reference to FIGS. 4B, and 7A-7D. As an example, the trajectory of the storm and the forecasted storm category level are visualized using the rules provided herein and the technique described with reference to FIG. 4B.

Figure 4B:
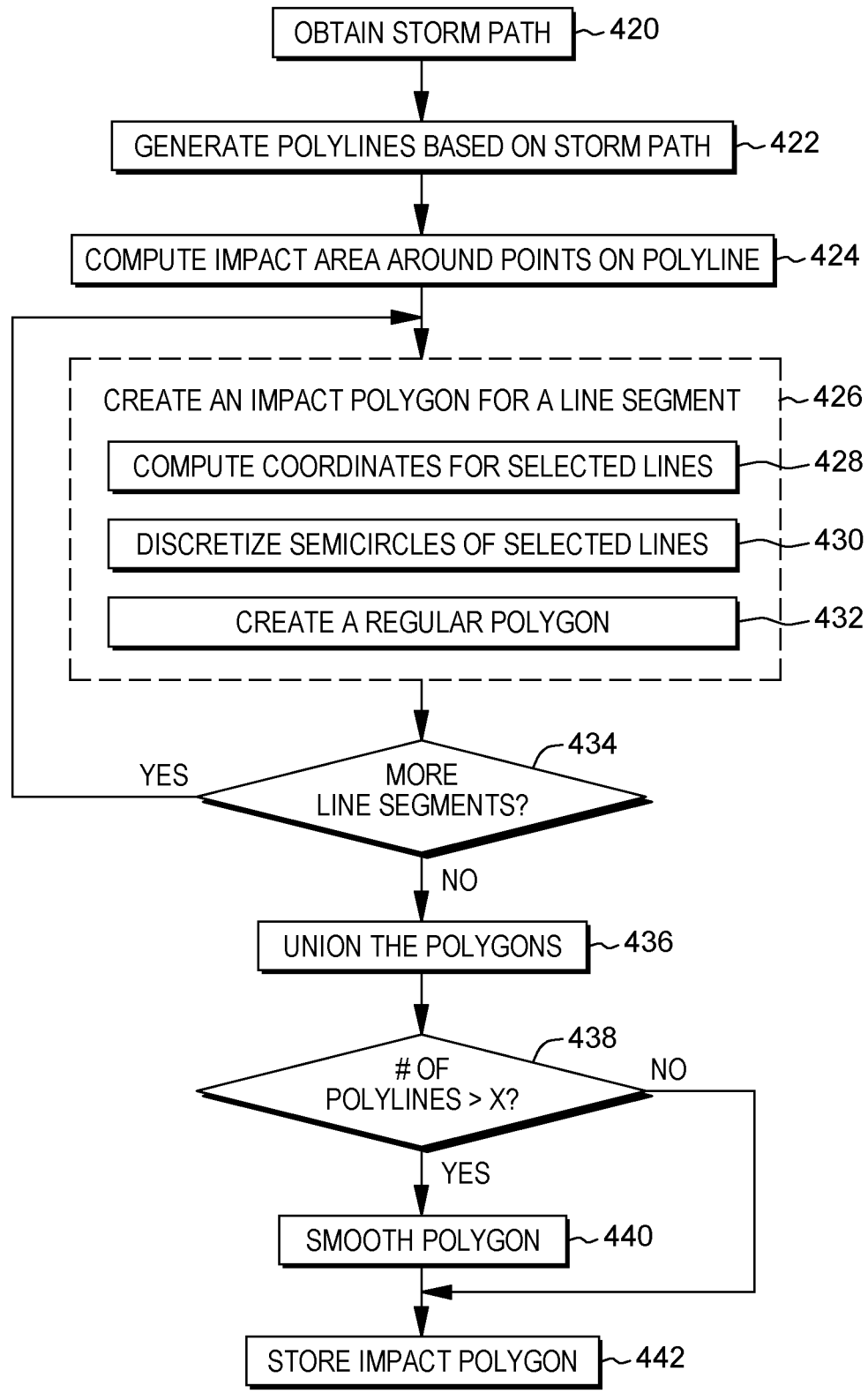
FIG. 4B depicts further details of one example of generating connected geospatial polygons along an event path, in accordance with one or more aspects of the present invention.

Referring to FIG. 4B, in one example, the storm path is obtained, STEP 420. For instance, the storm path may be obtained from a storm forecast website, like TWC, NOAA, the US Navy, etc. The storm path may be provided in latitude and longitude coordinates as a polyline, STEP 422. Along with the storm path, storm strength may also be provided in terms of, e.g., storm category/wind speed at each point (or select points) on the polyline. An impact area around each point (or select points) is computed as a circle of radius R, STEP 424. In one example, the radius is computed as follows depending on storm intensity at that point:

Cat1 r=(n miles/2)
Cat2 r=(2n miles/2)
Cat3 r=(3n miles/2)
Cat4 r=(4n miles/2)
Cat5 r=(5n miles/2), where n is 50 in one example. Many other examples exist.

Figure 7A:
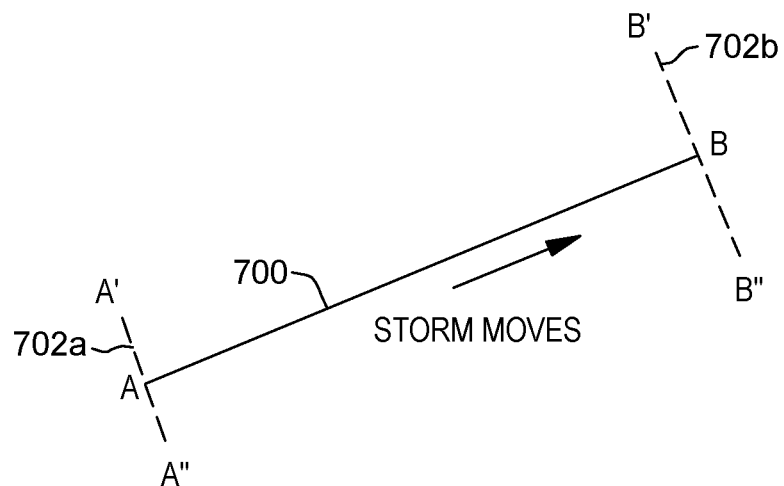
FIG. 7A depicts one example of a line segment used in accordance with an aspect of the present invention.
Figure 7B:
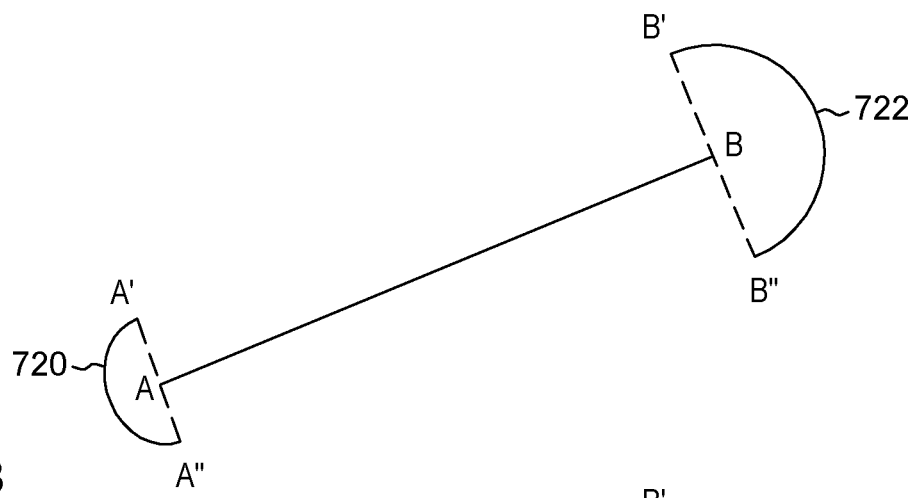
FIG. 7B depicts one example of the line segment of FIG. 7A in which intensity of the storm at various points is visualized using semicircles, in accordance with an aspect of the present invention.
Figure 7C:
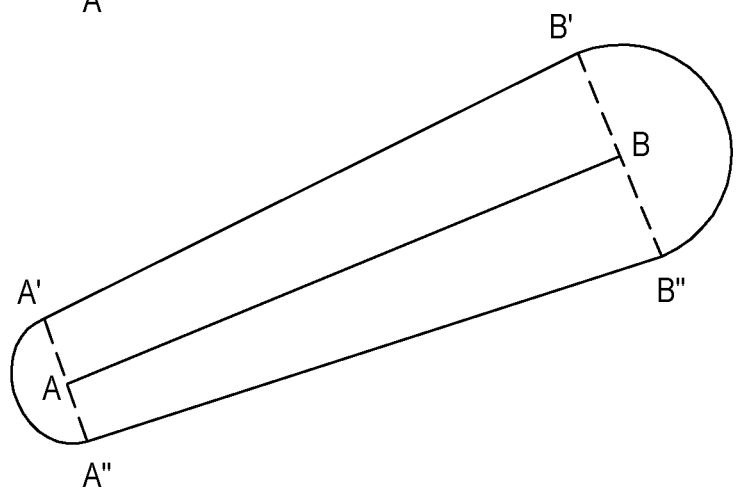
FIG. 7C depicts one example of a polygon created based on the line segment and semicircles of FIG. 7B, in accordance with an aspect of the present invention.

An impact polygon is created for the line segment, STEP 426. For instance, as shown in FIG. 7A, the storm moves from point A to point B creating a line segment 700. Coordinates for selected (e.g., dashed) lines 702a, 702b are computed, STEP 428 (FIG. 4B). The length is based on storm intensity at point A and storm intensity at point B. Line A'A" and line B'B" are perpendicular to line AB. As an example, the length of A' AA'=r based on storm intensity at point A. This is similar for B'B". Examples of resulting semicircles are depicted in FIG. 7B. The lower the intensity, the smaller the semicircle (or circle), as shown in FIG. 7B at 720; and the higher the intensity, the larger the semicircle (or circle), as shown at 722. The semicircle from A' to A" is discretized, STEP 430 (FIG. 4B), as well as the semicircle from B' to B". A regular polygon is made by connecting A"B" and A'B', as shown in FIG. 7C, STEP 432 (FIG. 4B). The resulting figure is a closed regular polygon which represents the impact area of the storm as it travels from point A to B.

Returning to FIG. 4B, a determination is made as to whether there are more line segments, INQUIRY 434. If there are more line segments, processing continues to STEP 426 to create similar polygons. If there are no more line segments for which polygons are to be created, the polygons are connected to create one large polygon (an example of which is depicted in FIG. 6B, STEP 436. For instance, 2D Boolean libraries, which are commercially available, are used to union the polygon shapes to create one large polygon.

Further, in one example, a determination is made as to whether the number of polylines of the polygon is greater than a defined number, x, INQUIRY 438. For instance, in commercial state of the art systems, there is a limitation of the size of the polygons which can be used for fast Geo-Json queries to find impact locations. Thus, if the number of polylines which form the polygon is greater than x, where x is the maximum number of polygons that can be handled, then a smoothing process is performed for the polygon, STEP 440.

Figure 7D:
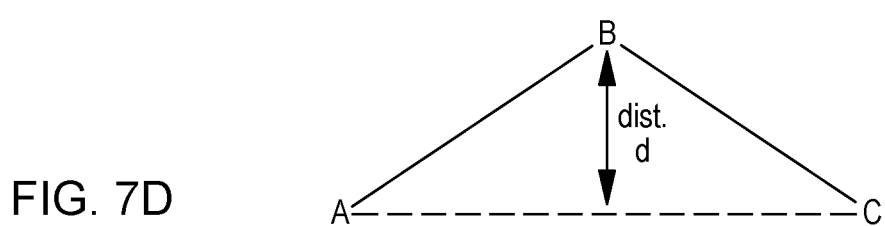
FIG. 7D depicts one example of several points of a polygon for which a smoothing process is performed, in accordance with an aspect of the present invention.

To smooth a polygon, in one example, iterate through each point (or select points) in the polygon to determine if it is within a tolerance delta (delta=r/100) of the line segments connecting its two neighboring points. In one particular example, the delta may be a half mile; however, many examples are possible. As shown in FIG. 7D, if distance d is less than the delta, then segment ABC is replaced with segment AC. This process is repeated for all (or select) points on the polygon, thus pruning the polygon. The number of lines which form the polygon is reduced, while keeping the polygon regular (e.g., shape and area does not change). A check is made as to whether the polygon size is acceptable (which depends on the database that is used to store and use the polygon). If the polygon size is unacceptable, then the smoothing process continues. Otherwise, the resulting polygon is stored in the database, STEP 442. The impact polygon stored in the database may be used to find impacting locations; that is, the locations within the polygon that may be impacted by the event.

As described herein, in one or more aspects, natural language analysis of social media, trusted internet sources and structured data for real-time display of storm impact analytics is provided. Storm impact analytics are displayed, e.g., as pareto graphs for selected objectives, such as wind speed, location impacted, impact type along the storm trajectory for any given point in time including future estimated locations, etc. A storm impact area calculation utilizes real-time based storm path and intensity data utilizing built-in polygon Boolean operators to avoid looping and polyline smoothing to reduce the data size while maintaining accuracy.

In one embodiment, Twitter and trusted media social communications are captured, along with the storm system. The social communication is captured for the current storm system and predictions about impact to the suppliers along the path are based on social media analytics with a predefined model used to gain insight from trusted internet sources, as well as Twitter, etc. Patterns derived from past events are applied to new events and allows for improved impact predictions.

In further examples, other weather events (e.g., winter storms, tornadoes, flooding, droughts) are monitored for proximity to location, based on alerts from public sources, such as, for instance: The Weather Company (TWC), GDACS (Global Disaster Alert and Coordination System), UBAlerts, and Weather Underground. Other examples also exist.

In one particular example, the geospatial epicenter of earthquakes is identified in proximity to locations of interest. In one example, the magnitude of the earthquake (on the Richter scale) sets the distance from the epicenter which is at risk. For instance, earthquakes >5 are assessed to represent a risk, in one example.

For some man-made risk events, their proximity to locations of interest may also be visualized. Examples include, but are not limited to, labor and transportation strikes, social or political disturbances, etc.

As described herein, in one aspect, a capability of facilitating processing of event impact risk over time is provided. One or more locations of interest on a geospatial map are identified, and an event path is plotted on the geospatial map for an event over time. The event path includes actual and forecasted paths of the event. Along the event path, connected geospatial polygons are generated. The geospatial polygons represent actual and forecasted intensities of the event over time. A determination is made as to whether the connected geospatial polygons intersect one or more of the locations of interest. An intersection identifies the one or more locations of interest as having an impact risk for the event. One or more actions are taken to reduce the impact risk for the one or more locations of interest.

In one example, the generating may include, for example, for each of the at least one location of interest: forming an impact circle over each of the locations of interest, in which a size of each impact circle represents actual and forecasted intensities of the event over time; grouping adjacent impact circles into one or more sets; creating an impact area for each of the one or more sets by extending external tangent lines between adjacent impact circles; generating a geospatial polygon for each impact area, resulting in a group of geospatial polygons; and connecting adjacent geospatial polygons of the group of geospatial polygons to form a regular polygon.

In one example, one or more of the geospatial polygons are smoothed. The smoothing resulting in smoothed geospatial polygons. In one example, the smoothing may include, for example, removing points along lines of the one or more geospatial polygons.

In one example, one or more GeoJson searches using the smoothed geospatial polygons are performed.

In one example, each geospatial polygon may include points. Prior to the connecting, for any point with a value larger than a predetermined value, an iteration is performed through the points to combine points by fitting replacement lines based on a predetermined tolerance.

In one example, an event may include, for example, a storm, and the one or more locations of interest may include, for example, one or more suppliers in a supply chain, and the one or more actions may include, for example, alerting the suppliers. Another risk mitigation action may include assessing days of inventory for impacted parts and determining if, for instance, another supplier, not affected by the risk event, is to be used to satisfy the demand.

In a further example, trusted information sources are searched for event information in real-time. The event information is analyzed to create a time sequenced view of the event information, and the time sequenced view is aligned with the connected geospatial polygons.

In one example, the trusted information source may include, for example, at least one of a weather information source, a social media source and a news source.

In one example, the generating the connected geospatial polygons may include, for example, generating geospatial polygons along the event path, and connecting adjacent geospatial polygons as they are generated.

One or more aspects of the present invention are inextricably tied to computer technology using such technology in real-time to facilitate processing of event impact risks, enabling time critical actions to be taken.

Figure 8:
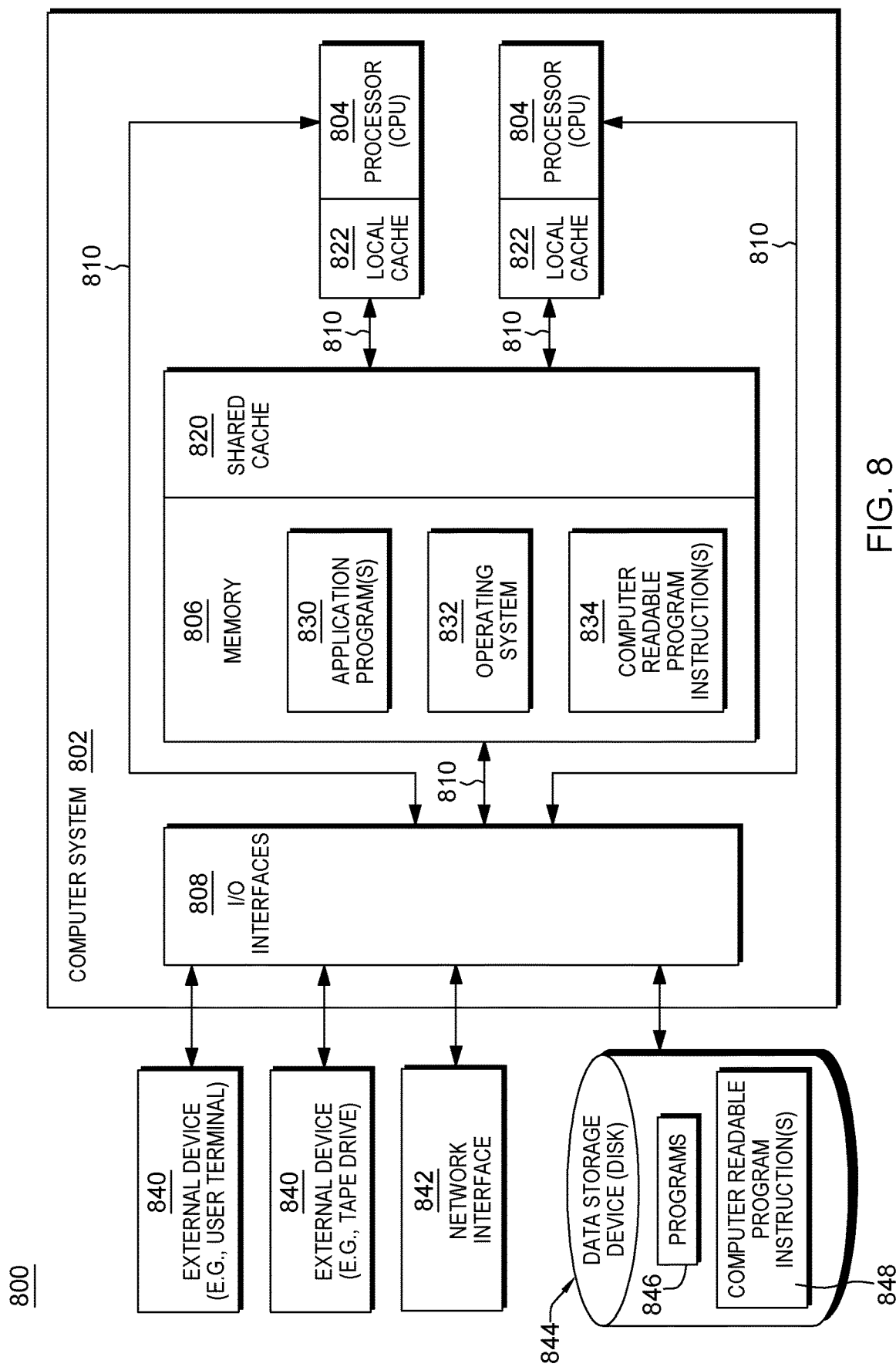
FIG. 8 depicts one example of a computing environment to incorporate and use one or more aspects of the present invention.

One or more aspects of the present invention may be incorporated and/or used in a computing environment, an example of which is described with reference to FIG. 8. As shown in FIG. 8, a computing environment 800 includes, for instance, a computer system 802 shown, e.g., in the form of a general-purpose computing device. Computer system 802 may include, but is not limited to, one or more processors or processing units 804 (e.g., central processing units (CPUs)), a memory 806 (a.k.a., system memory, main memory, main storage, central storage or storage, as examples), and one or more input/output (I/O) interfaces 808, coupled to one another via one or more buses and/or other connections 810.

Bus 810 represents one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 806 may include, for instance, a cache 820, such as a shared cache, which may be coupled to local caches 822 of processors 804. Further, memory 806 may include one or more programs or applications 830, an operating system 832, and one or more computer readable program instructions 834. Computer readable program instructions 834 may be configured to carry out functions of embodiments of aspects of the invention.

Computer system 802 may also communicate via, e.g., I/O interfaces 808 with one or more external devices 840, one or more network interfaces 842, and/or one or more data storage devices 844. Example external devices include a user terminal, a tape drive, a pointing device, a display, etc. Network interface 842 enables computer system 802 to communicate with one or more networks, such as a local area network (LAN), a general wide area network (WAN), and/or a public network (e.g., the Internet), providing communication with other computing devices or systems.

Data storage device 844 may store one or more programs 846, one or more computer readable program instructions 848, and/or data, etc. The computer readable program instructions may be configured to carry out functions of embodiments of aspects of the invention.

Computer system 802 may include and/or be coupled to removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media. It should be understood that other hardware and/or software components could be used in conjunction with computer system 802. Examples, include, but are not limited to: microcode, device drivers, redundant processing units, external disk drive arrays, RAID systems, tape drives, and data archival storage systems, etc.

Computer system 802 may be operational with numerous other general purpose or special purpose computing system environments or configurations. Examples of well-known computing systems, environments, and/or configurations that may be suitable for use with computer system 802 include, but are not limited to, personal computer (PC) systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Figure 9A:
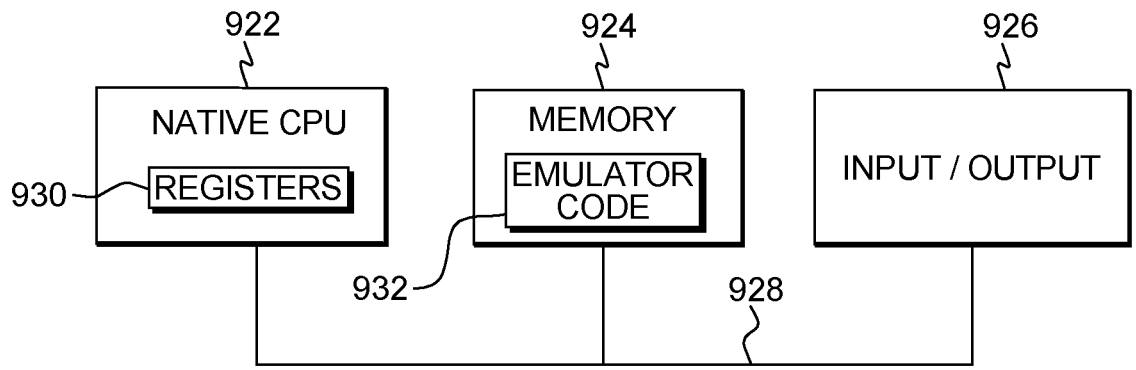
FIG. 9A depicts another example of a computing environment to incorporate and use one or more aspects of the present invention.

Other types of computing environments may also incorporate and use one or more aspects of the present invention, including, but not limited to, emulation environments, an example of which is described with reference to FIG. 9A. In this example, a computing environment 900 includes, for instance, a native central processing unit (CPU) 922, a memory 924, and one or more input/output devices and/or interfaces 926 coupled to one another via, for example, one or more buses 928 and/or other connections. As examples, computing environment 900 may include a PowerPC processor offered by International Business Machines Corporation, Armonk, N.Y.; and/or other machines based on architectures offered by International Business Machines Corporation, Intel, or other companies.

Native central processing unit 922 includes one or more native registers 930, such as one or more general purpose registers and/or one or more special purpose registers used during processing within the environment. These registers include information that represents the state of the environment at any particular point in time.

Moreover, native central processing unit 922 executes instructions and code that are stored in memory 924. In one particular example, the central processing unit executes emulator code 932 stored in memory 924. This code enables the computing environment configured in one architecture to emulate another architecture. For instance, emulator code 932 allows machines based on architectures other than the z/Architecture, such as PowerPC processors or other servers or processors, to emulate the z/Architecture and to execute software and instructions developed based on the z/Architecture.

Figure 9B:
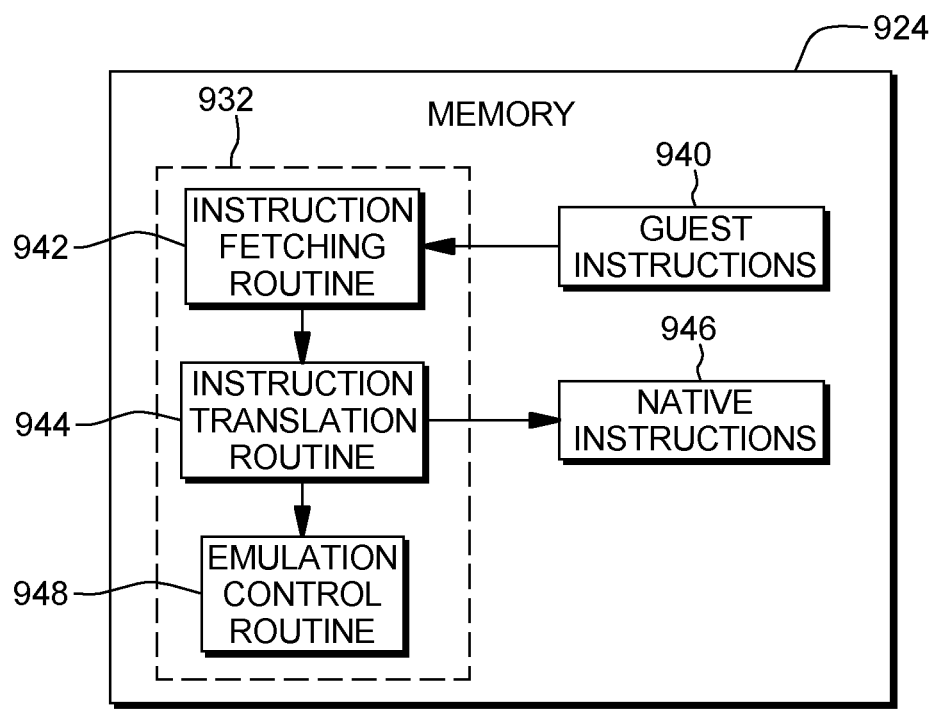
FIG. 9B depicts further details of the memory of FIG. 9A, in accordance with one or more aspects of the present invention.

Further details relating to emulator code 932 are described with reference to FIG. 9B. Guest instructions 940 stored in memory 924 comprise software instructions (e.g., correlating to machine instructions) that were developed to be executed in an architecture other than that of native CPU 922. For example, guest instructions 940 may have been designed to execute on a z/Architecture processor, but instead, are being emulated on native CPU 922, which may be, for example, an Intel processor. In one example, emulator code 932 includes an instruction fetching routine 942 to obtain one or more guest instructions 940 from memory 924, and to optionally provide local buffering for the instructions obtained. It also includes an instruction translation routine 944 to determine the type of guest instruction that has been obtained and to translate the guest instruction into one or more corresponding native instructions 946. This translation includes, for instance, identifying the function to be performed by the guest instruction and choosing the native instruction(s) to perform that function.

Further, emulator code 932 includes an emulation control routine 948 to cause the native instructions to be executed. Emulation control routine 948 may cause native CPU 922 to execute a routine of native instructions that emulate one or more previously obtained guest instructions and, at the conclusion of such execution, return control to the instruction fetch routine to emulate the obtaining of the next guest instruction or a group of guest instructions. Execution of native instructions 946 may include loading data into a register from memory 924; storing data back to memory from a register; or performing some type of arithmetic or logic operation, as determined by the translation routine.

Each routine is, for instance, implemented in software, which is stored in memory and executed by native central processing unit 922. In other examples, one or more of the routines or operations are implemented in firmware, hardware, software or some combination thereof. The registers of the emulated processor may be emulated using registers 930 of the native CPU or by using locations in memory 924. In embodiments, guest instructions 940, native instructions 946 and emulator code 932 may reside in the same memory or may be disbursed among different memory devices.

As used herein, firmware includes, e.g., the microcode of the processor. It includes, for instance, the hardware-level instructions and/or data structures used in implementation of higher level machine code. In one embodiment, it includes, for instance, proprietary code that is typically delivered as microcode that includes trusted software or microcode specific to the underlying hardware and controls operating system access to the system hardware.

One or more aspects may relate to cloud computing.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 10:
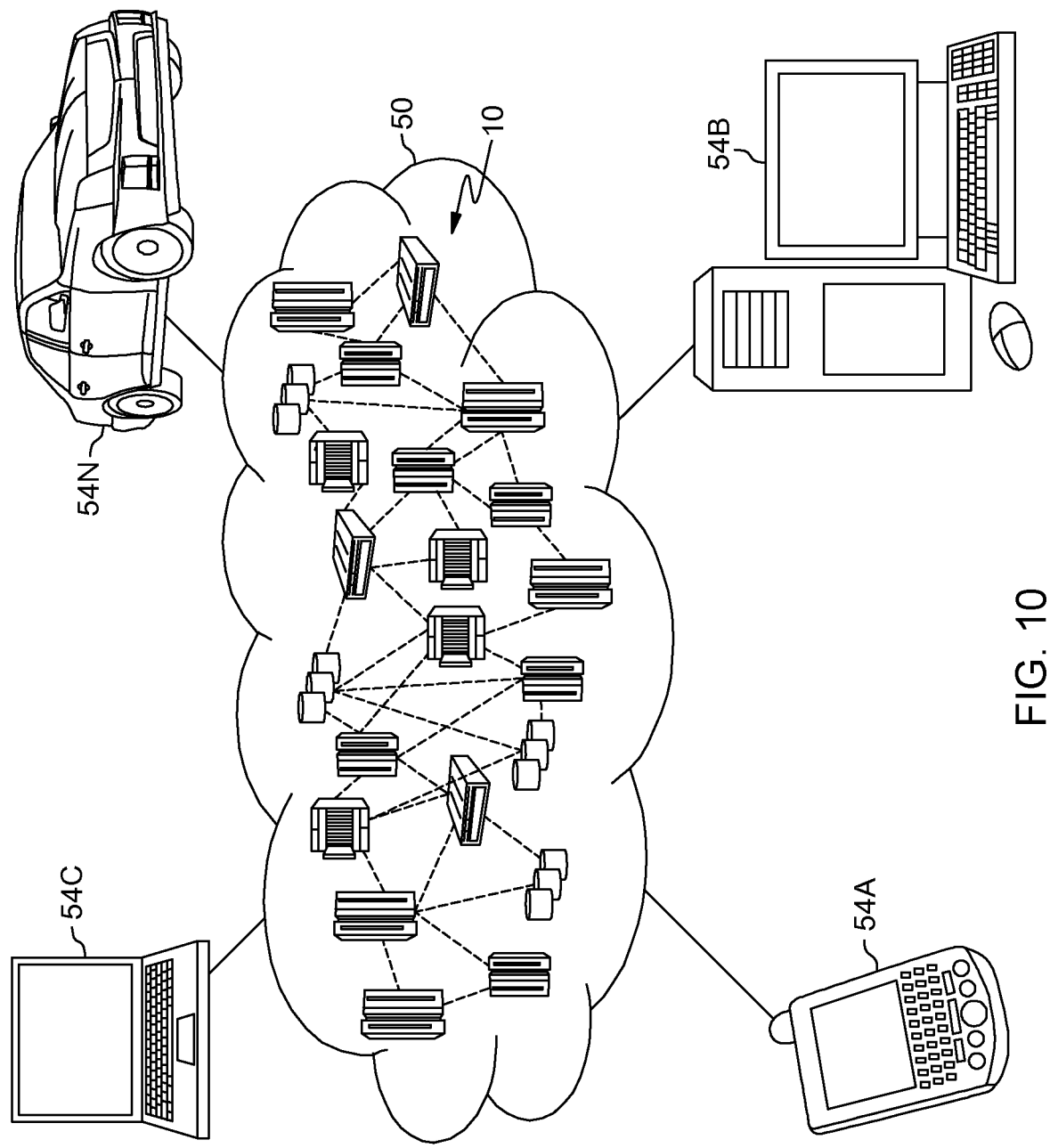
FIG. 10 is a block diagram of one example of a cloud computing environment useful with one or more aspects of the present invention.

Referring now to FIG. 10, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 10 are intended to be illustrative only and that computing nodes 10 and cloud computing environment 50 can communicate with any type of computerized device over any type of network and/or network addressable connection (e.g., using a web browser).

Figure 11:
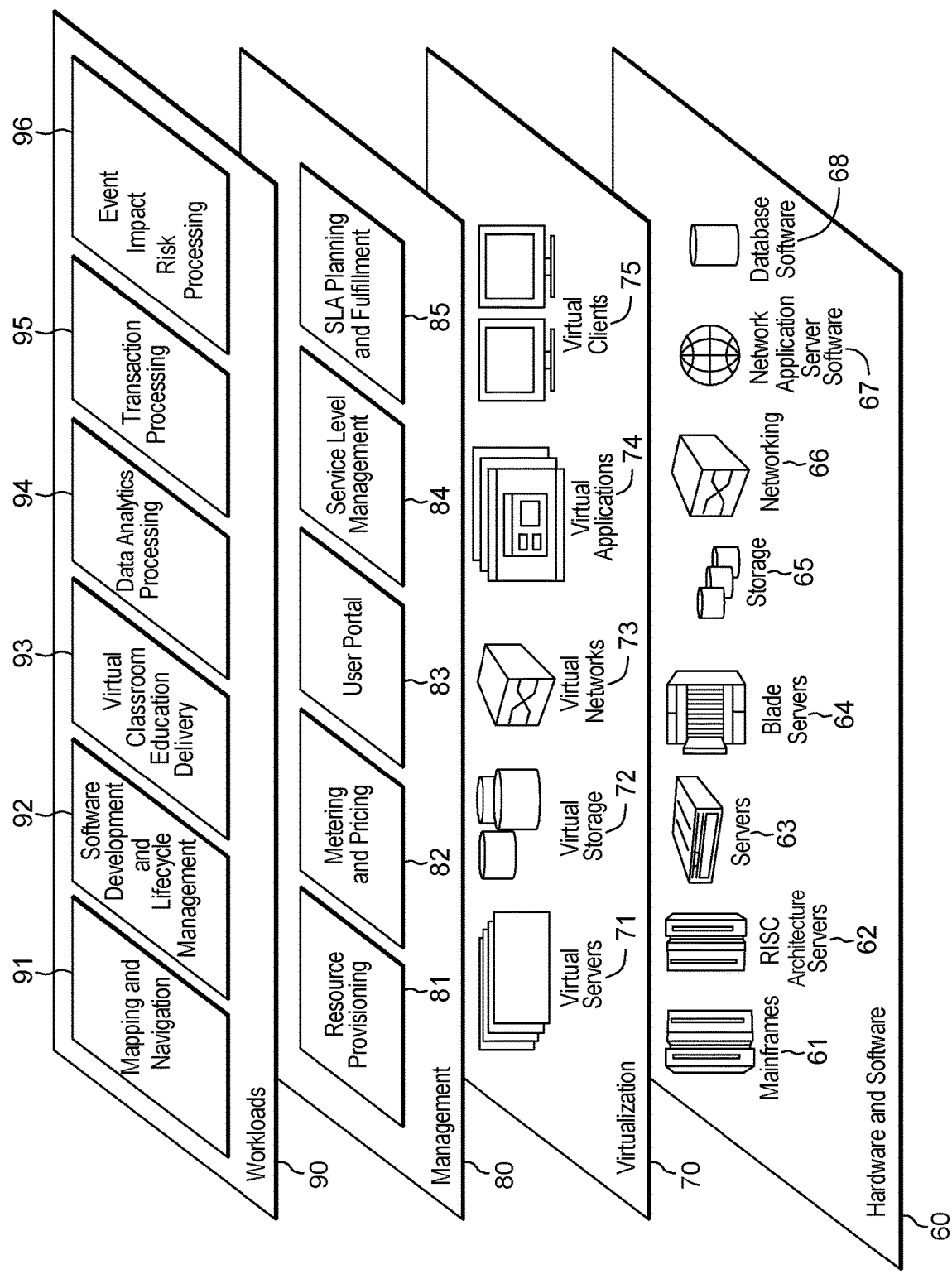
FIG. 11 is a block diagram of one example of a set of function abstraction layers provided by the cloud computing environment of FIG. 10.

Referring now to FIG. 11, a set of functional abstraction layers provided by cloud computing environment 50 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and event impact risk processing 96.

Aspects of the present invention and certain features, advantages, and details thereof, are explained herein with reference to the non-limiting examples illustrated in the accompanying drawings. Descriptions of well-known materials, fabrication tools, processing techniques, etc., are omitted so as not to unnecessarily obscure aspects of the invention in detail. It should be understood, however, that the detailed description and the specific examples, while indicating aspects of the invention, are given by way of illustration only, and are not by way of limitation. Various substitutions, modifications, additions, and/or arrangements, within the spirit and/or scope of the underlying inventive concepts will be apparent to those skilled in the art from this disclosure.

Approximating language that may be used herein throughout the specification and claims, may be applied to modify any quantitative representation that could permissibly vary without resulting in a change in the basic function to which it is related. Accordingly, a value modified by a term or terms, such as "about," is not limited to the precise value specified. In some instances, the approximating language may correspond to the precision of an instrument for measuring the value.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable or suitable. For example, in some circumstances, an event or capacity can be expected, while in other circumstances the event or capacity cannot occur—this distinction is captured by the terms "may" and "may be."

Spatially relative terms, such as "beneath," "below," "lower," "above," "upper," and the like, may be used herein for ease of description to describe one element's or feature's relationship to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "below" or "beneath" other elements or features would then be oriented "above" or "over" the other elements or features. Thus, the example term "below" may encompass both an orientation of above and below. The device may be otherwise oriented (e.g., rotated 90 degrees or at other orientations) and the spatially relative descriptors used herein should be interpreted accordingly. When the phrase "at least one of" is applied to a list, it is being applied to the entire list, and not to the individual members of the list.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more non-transitory computer readable storage medium(s) having computer readable program code embodied thereon.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, other environments may incorporate and use one or more aspects of the present invention. Further, other events may be monitored and/or other actions may be taken in response to the events. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method of depicting an event to facilitate performing a task, the computer-implemented method comprising:
    displaying on a display monitor a geospatial map as part of a graphical user interface;
    receiving, by one or more processors, input data relating to a particular entity desiring computer illustration of impact of a weather event on the geospatial map displayed on the display monitor;
    digitally highlighting at least one location of interest on the geospatial map displayed on the display monitor as part of the graphical user interface, the at least one location of interest being defined by the one or more processors using the input data;
    simultaneously displaying on the display monitor as part of the graphical user interface a plurality of dynamically changing attributes of the weather event obtained, by the one or more processors, from a plurality of real time online data sources;
    displaying as part of the graphical user interface multiple user-selectable digital buttons concurrent with displaying the geospatial map with the at least one location of interest and the plurality of dynamically-changing attributes of the weather event, the multiple user-selectable digital buttons being user-selectable to graphically display real-time information for one or more aspects of the weather event from current online reporting related to the weather event, and computerized analysis of the weather event;
    based on user-selection of one or more of the multiple user-selectable digital buttons, generating and displaying on the display monitor one or more graphs illustrating corresponding real-time information for the weather event;
    depicting, by the processor(s), an event path on the geospatial map displayed on the display monitor for the event over time, the event path comprising actual and forecasted paths of the weather event, wherein the depicting illustrates the event path on the geospatial map, along with the plurality of dynamically changing attributes of the weather event displayed on the display monitor, and comprises using data regarding the weather event obtained in real-time, and wherein the depicting comprises:
        obtaining, by the processor(s), an application programming interface (API) of an online weather data source; and
        executing, by the processor(s), the application programming interface of the weather data source to obtain the data regarding the weather event from the weather source in real time for depicting on the display monitor the event path comprising the actual and forecasted paths of the weather event;
    generating connected geospatial polygons along the event path displayed on the display monitor, the geospatial polygons representing at least one of actual and forecasted intensity of the weather event over time, wherein the generating comprises, for each of the at least one location of interest:
        forming an impact circle over each of the at least one location of interest, a size of each impact circle representing at least one of an actual and forecasted intensity of the weather event over time;

grouping adjacent impact circles into one or more sets;
creating an impact area for each of the one or more sets by extending external tangent lines between adjacent impact circles;
generating a geospatial polygon for each impact area, resulting in a group of geospatial polygons; and
connecting adjacent geospatial polygons of the group of geospatial polygons to form a regular polygon;
determining whether the connected geospatial polygons along the event path displayed on the display monitor intersect one or more of the at least one location of interest, an intersection identifying the one or more of the at least one location of interest as having an impact risk for the weather event; and
automatically diverting computing services of the entity from one location to another location to minimize impact on the computing services by the weather event, the automatically diverting being based on determining that the connected geospatial polygons along the event path displayed on the display monitor intersect the one or more of the at least one location of interest.

2. The computer-implemented method of claim 1, further comprising smoothing one or more geospatial polygons of the group of geospatial polygons, the smoothing resulting in one or more smoothed geospatial polygons.

3. The computer-implemented method of claim 2, wherein the smoothing comprises removing points along lines of the one or more geospatial polygons of the group of geospatial polygons.

4. The computer-implemented method of claim 2, further comprising performing one or more GeoJson searches using the one or more smoothed geospatial polygons.

5. The computer-implemented method of claim 1, wherein each geospatial polygon comprises a plurality of points, the method further comprising, prior to the connecting, for any point with a value larger than a predetermined value, iterating through the plurality of points to combine points by fitting replacement lines based on a predetermined tolerance.

6. The computer-implemented method of claim 1, further comprising searching one or more trusted information sources for event information in real-time, wherein the one or more trusted information sources comprises at least one of another weather information source, a social media source and a news source.

7. The computer-implemented method of claim 1, wherein the generating connected geospatial polygons comprises:
generating geospatial polygons along the event path; and
connecting adjacent geospatial polygons based on being generated.

8. A computer system for facilitating processing of event impact risk over time, the computer system comprising:
a memory; and
at least one processor in communication with the memory to perform a method, the method comprising:
displaying on a display monitor a geospatial map as part of a graphical user interface;
receiving, by one or more processors, input data relating to a particular entity desiring computer illustration of impact of a weather event on the geospatial map displayed on the display monitor;
digitally highlighting at least one location of interest on the geospatial map displayed on the display monitor as part of the graphical user interface, the at least one location of interest being defined by the one or more processors using the input data;
simultaneously displaying on the display monitor as part of the graphical user interface a plurality of dynamically changing attributes of the weather event obtained, by the one or more processors, from a plurality of real time online data sources;
displaying as part of the graphical user interface multiple user-selectable digital buttons concurrent with displaying the geospatial map with the at least one location of interest and the plurality of dynamically-changing attributes of the weather event, the multiple user-selectable digital buttons being user-selectable to graphically display real-time information for one or more aspects of the weather event from current online reporting related to the weather event, and computerized analysis of the weather event;
based on user-selection of one or more of the multiple user-selectable digital buttons, generating and displaying on the display monitor one or more graphs illustrating corresponding real-time information for the weather event;
depicting, by the processor(s), an event path on the geospatial map displayed on the display monitor for the event over time, the event path comprising actual and forecasted paths of the weather event, wherein the depicting illustrates the event path on the geospatial map, along with the plurality of dynamically changing attributes of the weather event displayed on the display monitor, and comprises using data regarding the weather event obtained in real-time, and wherein the depicting comprises:
obtaining, by the processor(s), an application programming interface (API) of an online weather data source; and
executing, by the processor(s), the application programming interface of the weather data source to obtain the data regarding the weather event from the weather source in real time for depicting on the display monitor the event path comprising the actual and forecasted paths of the weather event;
generating connected geospatial polygons along the event path displayed on the display monitor, the geospatial polygons representing at least one of actual and forecasted intensity of the weather event over time, wherein the generating comprises, for each of the at least one location of interest:
forming an impact circle over each of the at least one location of interest, a size of each impact circle representing at least one of an actual and forecasted intensity of the weather event over time;
grouping adjacent impact circles into one or more sets;
creating an impact area for each of the one or more sets by extending external tangent lines between adjacent impact circles;
generating a geospatial polygon for each impact area, resulting in a group of geospatial polygons; and
connecting adjacent geospatial polygons of the group of geospatial polygons to form a regular polygon;
determining whether the connected geospatial polygons along the event path displayed on the display monitor intersect one or more of the at least one location of interest, an intersection identifying the one or more of the at least one location of interest as having an impact risk for the weather event; and
automatically diverting computing services of the entity from one location to another location to minimize impact on the computing services by the weather event, the automatically diverting being based on determining that the connected geospatial polygons along the event path displayed on the display monitor intersect the one or more of the at least one location of interest.

9. The computer system of claim 8, wherein the method further comprises smoothing one or more geospatial polygon of the group of geospatial polygons, the smoothing resulting in one or more smoothed geospatial polygons.

10. The computer system of claim 8, wherein the method further comprises:
    searching one or more trusted information sources for event information in real-time, wherein the one or more trusted information sources comprising at least one of another weather information source, a social media source and a news source.

11. The computer system of claim 8, wherein the generating connected geospatial polygons comprises:
    generating geospatial polygons along the event path; and
    connecting adjacent geospatial polygons based on being generated.

12. A computer program product for facilitating processing of event impact risk over time, the computer program product comprising:
    a storage medium readable by a processor and storing instructions for performing a method of visualizing event impact risk over time, the method comprising:
      displaying on a display monitor a geospatial map as part of a graphical user interface;
      receiving, by one or more processors, input data relating to a particular entity desiring computer illustration of impact of a weather event on the geospatial map displayed on the display monitor;
      digitally highlighting at least one location of interest on the geospatial map displayed on the display monitor as part of the graphical user interface, the at least one location of interest being defined by the one or more processors using the input data;
      simultaneously displaying on the display monitor as part of the graphical user interface a plurality of dynamically changing attributes of the weather event obtained, by the one or more processors, from a plurality of real time online data sources;
      displaying as part of the graphical user interface multiple user-selectable digital buttons concurrent with displaying the geospatial map with the at least one location of interest and the plurality of dynamically-changing attributes of the weather event, the multiple user-selectable digital buttons being user-selectable to graphically display real-time information for one or more aspects of the weather event from current online reporting related to the weather event, and computerized analysis of the weather event;
      based on user-selection of one or more of the multiple user-selectable digital buttons, generating and displaying on the display monitor one or more graphs illustrating corresponding real-time information for the weather event;
      depicting, by the processor(s), an event path on the geospatial map displayed on the display monitor for the event over time, the event path comprising actual and forecasted paths of the weather event, wherein the depicting illustrates the event path on the geospatial map, along with the plurality of dynamically changing attributes of the weather event displayed on the display monitor, and comprises using data regarding the weather event obtained in real-time, and wherein the depicting comprises:
        obtaining, by the processor(s), an application programming interface (API) of an online weather data source; and
        executing, by the processor(s), the application programming interface of the weather data source to obtain the data regarding the weather event from the weather source in real time for depicting on the display monitor the event path comprising the actual and forecasted paths of the weather event;
      generating connected geospatial polygons along the event path displayed on the display monitor, the geospatial polygons representing at least one of actual and forecasted intensity of the weather event over time, wherein the generating comprises, for each of the at least one location of interest:
        forming an impact circle over each of the at least one location of interest, a size of each impact circle representing at least one of an actual and forecasted intensity of the weather event over time;
        grouping adjacent impact circles into one or more sets;
        creating an impact area for each of the one or more sets by extending external tangent lines between adjacent impact circles;
        generating a geospatial polygon for each impact area, resulting in a group of geospatial polygons; and
        connecting adjacent geospatial polygons of the group of geospatial polygons to form a regular polygon;
      determining whether the connected geospatial polygons along the event path displayed on the display monitor intersect one or more of the at least one location of interest, an intersection identifying the one or more of the at least one location of interest as having an impact risk for the weather event; and
      automatically diverting computing services of the entity from one location to another location to minimize impact on the computing services by the weather event, the automatically diverting being based on determining that the connected geospatial polygons along the event path displayed on the display monitor intersect the one or more of the at least one location of interest.

13. The computer program product of claim 12, wherein the method further comprises:
    searching one or more trusted information sources for event information in real-time, wherein the one or more trusted information sources comprising at least one of another weather information source, a social media source and a news source.

14. The computer program product of claim 12, wherein the method further comprises smoothing one or more geospatial polygons of the group of geospatial polygons, the smoothing resulting in one or more smoothed geospatial polygons.

15. The computer program product of claim 12, wherein the generating connected geospatial polygons comprises:
    generating geospatial polygons along the event path; and
    connecting adjacent geospatial polygons based on being generated.

16. The computer system of claim 8, wherein the weather event comprises a storm, wherein the at least one location of interest comprises at least one supplier in a supply chain, and wherein the alerting comprises alerting the at least one supplier.

17. The computer-implemented method of claim 1, wherein the obtaining data regarding the weather event comprises:
- obtaining latitude and longitude coordinates for the weather event as a plurality of polylines, each of the plurality of polylines comprising a plurality of points; and
- determining an impact area around one or more of the plurality of points.

18. The computer system of claim 8, wherein the obtaining data regarding the weather event comprises:
- obtaining latitude and longitude coordinates for the weather event as a plurality of polylines, each of the plurality of polylines comprising a plurality of points; and
- determining an impact area around one or more of the plurality of points.

19. The computer-implemented method of claim 1, wherein the at least one location of interest digitally highlighted on the display monitor as part of the graphical user interface is at least one moving location of at least one moving resource of the entity.

\* \* \* \* \*